(12) United States Patent
Cho et al.

(10) Patent No.: US 9,610,844 B2
(45) Date of Patent: Apr. 4, 2017

(54) POWER CONTROL SYSTEM AND METHOD FOR VEHICLE POWER OUTLETS

(71) Applicants: Hyundai Motor Company, Seoul (KR); Yura Corporation Co., Ltd, Cheongwon Gun, Chungcheongbuk-Do (KR)

(72) Inventors: Ha Young Cho, Gyeonggi-Do (KR); Jun Seo Park, Gyeonggi-Do (KR); Sung Il Lee, Gyeonggi-Do (KR); Jong Beom Park, Gyeonggi-Do (KR)

(73) Assignees: Hyundai Motor Company, Seoul (KR); Yura Corporation Co., Ltd., Cheongwon, Chungcheongbuk-do (KR)

( * ) Notice: Subject to any disclaimer, the term of this patent is extended or adjusted under 35 U.S.C. 154(b) by 659 days.

(21) Appl. No.: 14/134,218

(22) Filed: Dec. 19, 2013

(65) Prior Publication Data
US 2015/0084411 A1 Mar. 26, 2015

(30) Foreign Application Priority Data
Sep. 23, 2013 (KR) .......................... 10-2013-0112598

(51) Int. Cl.
*B60L 1/00* (2006.01)
*B60L 3/00* (2006.01)
(Continued)

(52) U.S. Cl.
CPC .............. *B60L 1/006* (2013.01); *B60L 3/0046* (2013.01); *B60L 11/1862* (2013.01);
(Continued)

(58) Field of Classification Search
CPC ....... B60L 11/18; B60L 11/1809; B60R 16/03; B60W 10/26; H02J 3/14; H02J 9/002
See application file for complete search history.

(56) References Cited

U.S. PATENT DOCUMENTS 4,905,115 A * 2/1990 Whidden ............... H02H 3/243
307/10.7
5,661,346 A * 8/1997 Budzyn .................. H01R 29/00
307/10.1
(Continued)

FOREIGN PATENT DOCUMENTS

JP 2003-065145 A 3/2003
JP KR 20080074185 A * 8/2008 .......... H02J 13/0013
(Continued)

*Primary Examiner* — Fritz M Fleming
*Assistant Examiner* — Rasem Mourad
(74) *Attorney, Agent, or Firm* — Mintz Levin Cohn Ferris Glovsky and Popeo, P.C.; Peter F. Corless

(57) ABSTRACT

A power control system and method for vehicle power outlets is provided which integrally controls power of power outlets mounted in a vehicle to improve the efficiency of power distribution in the vehicle and enable ordinary use of the power outlets while the vehicle is turned off. To this end, the power control system includes a startup power source configured to supply power to a plurality of power outlets mounted in a vehicle while the vehicle is turned on, a battery power source configured to supply power to the power outlet while the vehicle is turned off, and a controller configured to detect whether the vehicle is turned on, a battery charge capacity, and an electric current consumption quantity of each of the plurality of power outlets and determine a type of power that should be supplied to each power outlet and whether to supply power to each power outlet.

16 Claims, 2 Drawing Sheets

(51) Int. Cl.
*H02G 3/00* (2006.01)
*B60L 11/18* (2006.01)
*B60R 16/03* (2006.01)
*H02J 1/14* (2006.01)

(52) U.S. Cl.
CPC ............... *B60R 16/03* (2013.01); *H02J 1/14* (2013.01); *B60L 2240/547* (2013.01); *B60L 2240/549* (2013.01); *Y02T 10/7005* (2013.01); *Y02T 10/705* (2013.01); *Y02T 10/7044* (2013.01); *Y02T 10/92* (2013.01)

(56) References Cited

U.S. PATENT DOCUMENTS

| | | | | |
|---|---|---|---|---|
| 6,144,110 A | * | 11/2000 | Matsuda | H02J 9/04 307/10.1 |
| 8,125,181 B2 | * | 2/2012 | Gregg | B60W 10/26 180/65.29 |
| 2004/0232881 A1 | * | 11/2004 | Amano | B60L 11/14 320/104 |
| 2006/0164223 A1 | * | 7/2006 | Gilbert | H02J 9/002 340/438 |
| 2010/0019574 A1 | * | 1/2010 | Baldassarre | H02J 3/14 307/23 |
| 2010/0174419 A1 | * | 7/2010 | Brumfield | G01R 22/10 700/295 |
| 2012/0235472 A1 | * | 9/2012 | Aragai | B60R 16/03 307/9.1 |
| 2013/0328388 A1 | * | 12/2013 | McKee | B60R 16/027 307/9.1 |

FOREIGN PATENT DOCUMENTS

| | | |
|---|---|---|
| KR | 10-2008-0074185 | 8/2008 |
| KR | 10-2012-0062119 | 6/2012 |

* cited by examiner

POWER CONTROL SYSTEM AND METHOD FOR VEHICLE POWER OUTLETS

CROSS-REFERENCE TO RELATED APPLICATION

This application claims under 35 U.S.C. §119(a) the benefit of Korean Patent Application No. 10-2013-0112598 filed on Sep. 23, 2013, the entire contents of which are incorporated herein by reference.

BACKGROUND (a) Technical Field

The present disclosure relates to a power control system and method for vehicle power outlets, and more particularly, to a power control system and method for vehicle power outlets, which integrally controls power to power outlets mounted in a vehicle to improve the efficiency of power distribution in the vehicle and enable ordinary use of the power outlets.

(b) Background Art

Black boxes, navigation systems, seat heating s, and portable lamps are representative of typical electronic devices that are mounted in vehicles to provide additional functions to passengers. In order to operate accordingly, the electronic devices are supplied with power through power outlets within the vehicles.

The power outlet is a means installed in the vehicle to connect an electronic device installed in the vehicle with power from the vehicle (the battery). At present, in the vehicle, the power outlet is connected to a battery power terminal or a starting power terminal, and generally, is supplied with power during ignition.

If a short occurs due to a problem in a load connected to the power outlet or in the power outlet itself, an electric wire or a fuse may be damaged, causing a failure. When a user arbitrarily connects devices, such as a black box, to the battery power, battery discharge frequently occurs, which can eventually damage the battery.

Thus, conventionally, a battery monitoring system is provided to prevent rapid discharge of the battery. These conventional systems, however, are configured to prevent discharge of the battery simply by using the battery power according to voltage classification based on power distribution, which still causes damage to the battery during a startup operation.

SUMMARY OF THE DISCLOSURE

Accordingly, various aspects of the present invention provide a power control system and method for vehicle power outlets, which integrally and automatically controls supply power to power outlets mounted in a vehicle to improve the efficiency of power distribution within the vehicle, and thus enables ordinary use of the power outlets and reduces a battery discharge rate.

According to one of various aspects of the present invention, there is provided a power control system for vehicle power outlets, the power control system including a startup power source configured to supply power to multiple power outlets mounted in a vehicle during ignition, a battery power source configured to supply power to the power outlet while the engine or motor are not running, and a controller configured to detect when a vehicle is being started, a battery charge capacity, and an electric current consumption quantity of each of the plurality of power outlets and determine a type of power supplied to each power outlet and whether to supply power to each power outlet.

The power control system may further include an Intelligent Power Switch (IPS) configured to detect an electric current consumption quantity of each power outlet to feed the detecting result back to the controller, and configured to control supply and cutoff of power supplied to each power outlet based on determination of the controller.

The controller may recognize a power outlet whose electric current consumption quantity is detected while the engine or motor is turned off and supplies battery power to the recognized power outlet accordingly.

While the engine or motor is turned off, the controller may cut off pow to some of operating power outlets if a battery charge capacity is less than a battery consumption quantity of the power outlets. If a battery charge capacity falls to a particular level or lower, the controller may determine a priority according to a use frequency of each power outlet and cut off power of each power outlet sequentially according to the determined priority.

The controller may also cut off power to a power outlet if an abnormal operation of the power outlet is detected. If there is a power outlet for which power supply is cut off among the plurality of power outlets mounted in the vehicle, the controller may inform a user of the power outlet status.

According to another aspect of the present invention, there is provided a power control method for vehicle power outlets, the power control method including (a) detecting, by a controller, ignition of a vehicle, a charge capacity of battery power, and an electric current consumption quantity of a power outlet, (b) determining, by the controller, a type of power supplied to a power outlet mounted in the vehicle based on the startup state of the vehicle, (c) supplying, by the controller, the battery power to an operating power outlet when the engine or the motor are turned off, and (d) determining whether to cut off the battery power supplied to each power outlet, when the charge capacity of the battery power fails to a particular level or lower.

In some exemplary embodiments, determining whether to cut off the battery power supplied to each power outlet may include cutting off power of some of the operating power outlets when the battery charge capacity is less than a battery consumption quantity of the power outlets while the engine or motor is turned off.

In some exemplary embodiments, determining whether to cut off the battery power supplied to each power outlet may include determining a priority based on a user frequency of each power outlet and cutting off power of each power outlet sequentially according to the determined priority when the charge capacity of the battery power falls to a particular level or lower.

The power control method may further include supplying startup power to all power outlets mounted in the vehicle when the controller determines that the vehicle has been turned on (ignition on).

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DETAILED DESCRIPTION

Figure 1:
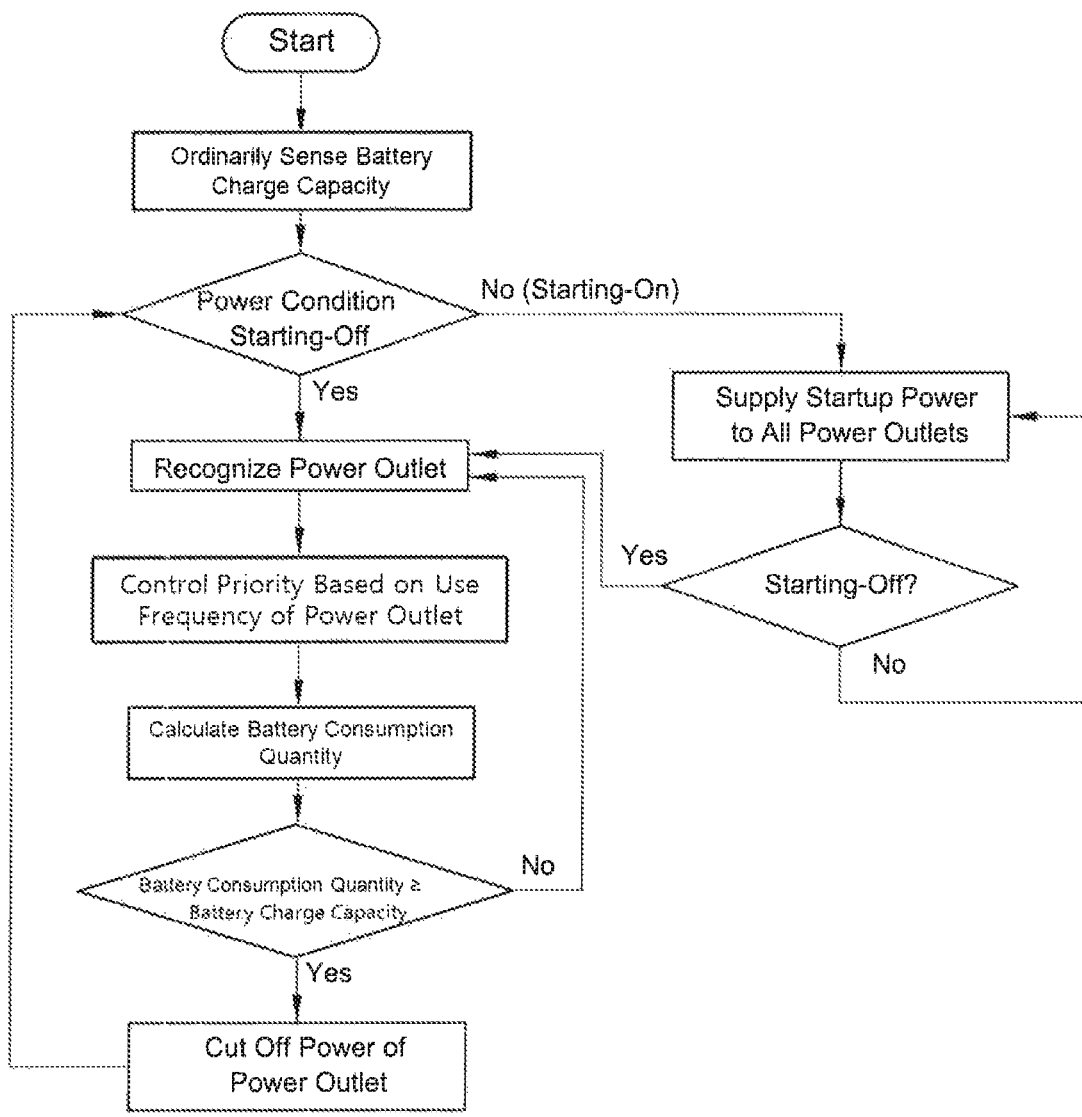
FIG. 1 is a schematic diagram showing a power control method for vehicle power outlets according to the present invention.

Hereinafter, the present invention will be described to allow those of ordinary skill in the art to easily carry out the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g., fuels derived from resources other than petroleum).

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about.

The present invention integrally and automatically controls a plurality of power outlets mounted in a vehicle to allow the power outlets to be used efficiently when the ignition is off in the vehicle, thereby reducing battery discharge rate and improving the efficiency of power distribution in the vehicle.

Thus, in the present invention, the power of a power outlet is differentially controlled according to a startup state of the vehicle. In particular, when the vehicle is turned off, the power state of the battery is determined to control whether to cut off power (battery power) to the power outlet according to a priority based structure.

In the vehicle, multiple (plurality of) power outlets may be installed, if necessary, and each power outlet is connected to an ordinary power terminal and a startup power terminal.

As shown in FIG. 1, a controller of the vehicle monitors a startup state of the vehicle, that is, an on/off state of the startup power source, a battery charge capacity (the remaining charge capacity of the battery power), and an electric current consumption quantity of a load connected to a power outlet (an electric current consumption quantity of the power outlet). Herein, the controller may use a Micro Control Unit (MCU) mounted in the vehicle.

When the vehicle is started, all the power outlets installed in the vehicle are supplied with power. In a starting-on state (when the vehicle is running), if a user stops the vehicle, the power outlet connected to startup power source operates via battery power; if a battery charge capacity falls to a particular level or lower, the battery power is automatically cut off by determination of the controller.

In other words, the power outlet normally operating with the startup power source operates via the battery power when the vehicle is turned off (engine or motor is off), and during operation, if the battery charge capacity falls to a particular level or lower, the battery power is automatically cut off to stop power supply.

That is, if the controller determines that the battery charge capacity is lower than a particular level when the power outlet normally operates with the battery power, then the controller automatically cuts off the battery power supplied to the power outlet. The controller determines a priority of each power outlet installed in the vehicle based on a use frequency of the power outlet, and controls power cutoff sequentially according to the priority.

In other words, the controller recognizes the use frequency of the respective power outlets installed in the vehicle, determines a priority of each of the power outlets based on the use frequency, and cuts off the power sequentially from the power outlet having the lowest priority (or the highest priority).

The use frequency of the power outlet is identified according to the accumulative number of times the power outlet (that is, a load connected to the power outlet) is used, and a determination of whether to use the power outlet is monitored by an Intelligent Power Switch (IPS) connected between the controller and the power outlet.

The IPS detects and controls operations of the power outlets in the vehicle via monitoring and controlling of the controller. The IPS ordinarily detects whether each power outlet operates (is used), a type of power applied to each power outlet (ordinary power source or startup power source), and an electric consumption quantity of each power outlet, and feeds the detecting results back to the controller.

The IPS detects supply and cutoff of electric current applied to each power out to determine whether each power outlet operates. For example, if power consumption of the load connected to the power outlet occurs, that is, electric current consumption of the power outlet occurs, the IPS detects and identifies that the power outlet is operating.

If a driver uses the power outlet when the vehicle is stopped, the controller calculates and considers a battery consumption quantity, which is a sum of electric current power consumption quantities of the operating power outlets, to supply battery power to the power outlet within a limit that does not affect the ignition of the vehicle. When the vehicle is running, the battery power for the power outlet is cut off and the startup power is supplied to all the power outlets of the vehicle.

For example, if the battery charge capacity is less than a sum of an electric current consumption quantity of the power outlet and a battery consumption quantity necessary for vehicle startup, or if an electric current consumption quantity of the load required by the power outlet is greater than the battery charge capacity, then the controller cuts off the battery power supplied to the power outlet.

That is, the controller partially cuts off the battery power supplied to the power outlets, if the battery charge capacity is less than the battery consumption quantity of the power outlet (a sum of electric current consumption quantities of the operating power outlets). In other words, the controller cuts off power of some of the power outlets supplied with the battery power while still providing those most frequently used outlets with power.

In addition, if the battery charge capacity is greater than a sum of the electric current consumption quantity of the power outlet and the battery power consumption quantity necessary for vehicle startup, or if the electric current consumption quantity of the load required for the power outlet is less than the battery charge capacity, then the controller maintains the battery power (does not cut off) the battery power supplied to the power outlets.

That is, taking into account the battery charge capacity and the electric current consumption quantity of the power outlet, the controller supplies power to the operating power outlet within a limit that does not affect vehicle startup. If startup is affected, the power of the operating power outlet is automatically cut off according to a priority, thereby preventing discharge and damage to the battery and protecting the battery, and thus guaranteeing startup performance.

Therefore, to stably and effectively supply the battery power to the power outlet, the battery charge capacity needs to be greater than the battery consumption quantity, and for example, the battery charge capacity should be greater than a sum of the electric current consumption quantity of the power outlet and the battery consumption quantity necessary for vehicle startup, and in this case, the battery power may be supplied to the power outlet.

As a result, overcurrent and overvoltage of the power outlet with respect to the battery charge capacity may be prevented to reduce the amount of stress introduced to the battery power terminal, and through a pre-protection function which prevents damage of the battery in advance, inconvenience associated with fuse replacement may be improved.

The controller monitors a state of each power outlet in the vehicle, such that if a problem occurs in the power outlet or the power of the power outlet is automatically cut off, such a state is displayed to the user. That is, if among the plurality of power outlets mounted in the vehicle, power supply is cut off for a power outlet, that is, power cutoff occurs for any one of the plurality of power outlets (power of one or two or more power outlets of the plurality of power outlets are automatically cut off and thus such power outlets are disabled), the user is informed of such a state.

In addition, upon detecting an abnormal operation of the power outlet due to overcurrent and a short, the controller cuts off power to the power outlet and informs the user of the state as such. Supply of overcurrent to the power outlet or occurrence of the short in the power outlet is detected by the IPS, and the IPS, upon detecting the abnormal operation of the power outlet, feeds the detecting result back to the controller.

The controller recognizes/monitors and determines the state of the power outlet through the IPS, and displays state information of the power outlet to the driver through a cluster of the vehicle. In this way, by integrally and automatically managing power outlets mounted in the vehicle, a power outlet which is not available currently due to cutoff of power supply and a power outlet which has a problem are informed to the user, so that the user may not use such power outlets.

Figure 2:
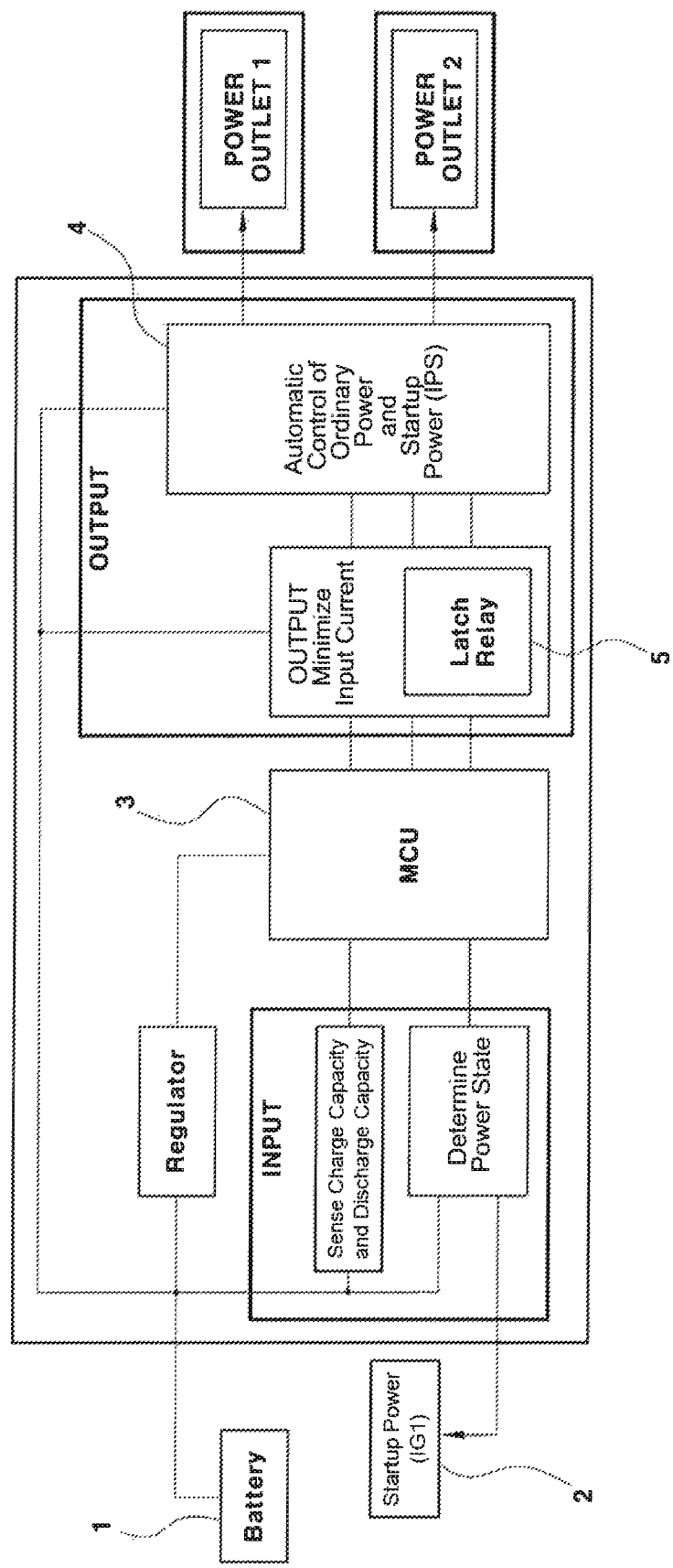
FIG. 2 is a diagram showing a power control system for vehicle power outlets according to an exemplary embodiment of the present invention.

FIG. 2 is a diagram showing a power control system for a vehicle power outlet according to an embodiment of the present invention. As shown in FIG. 2, the power control system according to the exemplary embodiment of the present invention may include startup power source 2 that supplies power to plurality of power outlets installed in the vehicle, battery power source (ordinary power source) 1 that supplies power to an operating power outlet among the installed power outlets, and a controller 3 configured to monitor a starting-on/off state of the vehicle, a battery charge capacity, and an electric current consumption quantity of a load connected to the plurality of power outlets.

Each power outlet of the plurality of power outlets is connected to the battery power 1 and the startup power source 2 through the controller 3, and is supplied with power from the ordinary power source 1 or the startup power source 2 through an output corresponding to an input of the controller 3. The controller 3 monitors the battery charge capacity and discharge capacity, and the on/off state of the startup power source 2, uses (receives) the monitored results as inputs thereof, and uses (outputs) control current for controlling an IPS 4 as outputs thereof, thereby automatically controlling power supplied to the power outlets depending on the operation state of the vehicle.

In this case, the controller 3 minimizes the control current (instruction signal) destined to the IPS 4 through a latch relay 5 before supplying the control current to the IPS 4, thereby securing operation safety, and the power for each power outlet is outlet is automatically controlled through the IPS 4. The controller 3 determines a type of power supplied to each power outlet of the vehicle based on a startup state of the vehicle (i.e., ordinary or startup).

The controller 3 detects an electric current consumption quantity of a load connected to each power outlet through the IPS and controls an electric current quantity supplied to each power outlet according to the detected electric current consumption quantity of the load.

The controller 3 then identifies generation of electric current consumption of a power outlet through the IPS 4 while the engine or motor is turned off, that is, the controller 3 identified only a power outlet in which electric current consumption of the load occurs as operating, and supplies battery power only to the power outlet recognized as operating.

Moreover, as mentioned above, when the controller 3 supplies the battery power to operate the power outlet while the engine or motor is turned off, if the battery charge capacity falls to a particular level or lower, the controller 3 automatically cuts off the battery power according to a priority of the power outlet.

To do so, the controller 3 collects and secures use frequency data of each power outlet of the plurality of power outlets, which is detected for a particular time and transmitted by the IPS 4, determines a priority of each power outlet by using the use frequency data, and cuts off power of the power outlets sequentially according to the priorities of the power outlets.

The controller 3 calculates the battery consumption quantity, which is a sum of electric current consumption quantities of the operating power outlets, and if the calculated battery consumption quantity is great than the battery charge capacity, the controller 3 cuts off the power of the power outlets sequentially according to the priorities of the power outlets.

The power control system for the power outlets according to the present invention integrally and automatically controls power of the power outlets to improve the efficiency of power distribution in the vehicle, allowing ordinary use of the power outlets when the vehicle is turned off and thus responding to an increase in the use of an electronic device in the vehicle while still reducing battery discharge rate.

Moreover, the present invention may also provide the following effects.

First, when the user uses a power outlet, corresponding electric current consumption quantity (the electric current consumption quantity of a load connected to the power outlet) is automatically identified and power is supplied for ordinary use, thus improving user convenience.

Second, a switch operation of the battery or startup power is automatically identified to automatically control the operation of the power outlet according to the battery charge capacity and the startup power state, thereby enhancing battery efficiency.

Third, the use frequency and priority of the power outlet are identified and the power of the power outlet is differentially controlled based on the use frequency and priority of the power outlet, such that for increased battery consumption, the power of the power outlet is automatically cut off, thereby protecting the battery and securing the startup performance.

Fourth, when an overcurrent and overvoltage occurs, stress introduced to the battery terminal may be prevented and inconvenience associated with the after-service (A/S) of the fuse may be avoided through pre-protection.

Fifth, the power outlets in the vehicle are integrally controlled, so that an abnormal power outlet having a problem is identified to the user in order to prevent the user from using said power outlet.

While the embodiment of the present invention have been described in detail, the scope of the present invention is not limited to the foregoing embodiment and various modifications and improves made by those of ordinary skill in the art using the basic concept of the present invention defined in the appended claims are also included in the scope of the present invention.

DESCRIPTION OF REFERENCE NUMERALS

| | |
|---|---|
| 1: Ordinary Power source (Battery Power) | 2: Startup Power source |
| 3: Controller | 4: Intelligent Power Switch (IPS) |
| 5: Latch Relay | |

What is claimed is:

1. A power control system for vehicle power outlets, the power control system comprising:
   a startup power source configured to supply power to a plurality of power outlets mounted in a vehicle while the vehicle is turned on;
   a battery power source configured to supply power to one or more of the plurality of power outlets while the vehicle is turned off; and
   a controller configured to detect when the vehicle is turned on, a battery charge capacity, and an electric current consumption quantity of each of the plurality of power outlets and determine a type of power supplied to each power outlet and whether to supply power to each power outlet respectively,
   wherein the controller identifies a power outlet whose electric current consumption quantity is detected while the vehicle is turned off, and
   wherein when a battery charge capacity is less than a sum of an electric current consumption quantity of the power outlet and a battery consumption quantity necessary for a vehicle startup, the controller automatically determines a priority according to a use frequency of each power outlet and cuts off power of each power outlet sequentially according to the determined priority for each power outlet of the plurality of power outlets.

2. The power control system of claim 1, further comprising:
   an Intelligent Power Switch (IPS) configured to detect an electric current consumption quantity of each power outlet to feed the detecting result back to the controller, and configured to control supply and cutoff of power supplied to each power outlet based on determination of the controller.

3. The power control system of claim 1, supplies battery power to the identified power outlet.

4. The power control system of claim 1, wherein while the vehicle is turned off, the controller cuts off power to some of operating power outlets when a battery charge capacity is less than a battery consumption quantity of the power outlets.

5. The power control system of claim 1, wherein the controller cuts off power of a particular power outlet of the plurality of power outlets when an abnormal operation of the particular power outlet is detected.

6. The power control system of claim 1, wherein when there is a particular power outlet for which power supply is cut off among the plurality of power outlets mounted in the vehicle, the controller informs a user that power to that particular power outlet has been terminated.

7. A power control method for vehicle power outlets, the power control method comprising:
   (a) detecting, by a controller, whether a vehicle is turned on, a charge capacity of battery power, and an electric current consumption quantity of a plurality of power outlets in the vehicle;
   (b) determining, by the controller, a type of power supplied to a power outlet of the plurality of power outlets mounted in the vehicle based whether the vehicle is turned on or not;
   (c) supplying, by the controller, battery power to an operating power outlet of the plurality of power outlets while the vehicle is turned off; and
   (d) determining, by the controller, whether to cut off the battery power supplied to each power outlet of the plurality of power outlets, when the charge capacity of the battery power falls to a particular level or lower,
   wherein (d) comprises identifying a power outlet whose electric current consumption quantity is detected while the vehicle is turned off, and wherein when a battery charge capacity is less than a sum of the electric current consumption quantity of the power outlet and a battery consumption quantity necessary for a vehicle startup, automatically determining a priority according to a use frequency of each power outlet and cutting off power of each power outlet sequentially according to the determined priority for each power outlet of the plurality of power outlets.

8. The power control method of claim 7, wherein (d) comprises cutting off power to some of power outlets that are operating, when the battery charge capacity is less than a battery consumption quantity of the power outlets during starting-off.

9. The power control method of claim 7, further comprising supplying startup power to all power outlets mounted in the vehicle when vehicle is turned on.

10. The power control method of claim 7, further comprising notifying a user of a power outlet status, when as the result of determination, there is a power outlet for which power supply is cut off among multiple power outlets mounted in the vehicle.

11. The power control method of claim 7, further comprising cutting off power of a power outlet and notifying the user of the power outlet when an abnormal operation of the power outlet is detected.

12. A non-transitory computer readable medium containing program instructions executed by a processor, the computer readable medium comprising:
 program instructions that detect whether a vehicle is turned on, a charge capacity of battery power, and an electric current consumption quantity of a plurality of power outlets in the vehicle;
 program instructions that determine a type of power supplied to a power outlet of the plurality of power outlets mounted in the vehicle based whether the vehicle is turned on or not;
 program instructions that supply battery power to an operating power outlet of the plurality of power outlets while the vehicle is turned off;
 program instructions that determine whether to cut off the battery power supplied to each power outlet of the plurality of power outlets, when the charge capacity of the battery power falls to a particular level or lower;
 program instructions that identify a power outlet whose electric current consumption quantity is detected while the vehicle is turned off; and
 program instructions that automatically determine a priority according to a user frequency of each power outlet and cut off power of each power outlet sequentially according to the determined priority for each power outlet of the plurality of power outlets when a battery charge capacity is less than a sum of the electric current consumption quantity of the power outlet and a battery consumption quantity necessary for a vehicle startup.

13. The non-transitory computer readable medium of claim 12, wherein the program instructions that cut off the battery power supplied to each power outlet of the plurality of power outlets further includes program instructions that cut off power to some of power outlets that are operating, when the battery charge capacity is less than a battery consumption quantity of tepowe outlets during starting-off.

14. The non-transitory computer readable medium of claim 12, further comprising program instructions that supply startup power to all power outlets mounted in the vehicle when on the vehicle is turned on.

15. The non-transitory computer readable medium claim 12, further comprising program instructions that notify a user of a power outlet status, when as the result of determination, there is a power outlet for which power supply is cut off among multiple power outlets mounted in the vehicle.

16. The non-transitory computer readable medium of claim 12, further comprising program instruction that cut off power of a power outlet and notifying the user of the power outlet when an abnormal operation of the power outlet is detected.

* * * * *